United States Patent [19]

Hamada et al.

[11] 4,141,426

[45] Feb. 27, 1979

[54] SUPPORT ASSEMBLY FOR RADIATORS AND AIR CONDITIONING CONDENSORS

[75] Inventors: Makoto Hamada; Shuji Miura; Hiroyuki Watanabe, all of Toyota, Japan

[73] Assignee: Toyota Jidosha Kogyo Kabushiki Kaisha, Aichi, Japan

[21] Appl. No.: 791,572

[22] Filed: Apr. 27, 1977

[30] Foreign Application Priority Data

Dec. 23, 1976 [JP] Japan .................... 51/173326[U]

[51] Int. Cl.² ........................................... B60K 11/02
[52] U.S. Cl. ................................................ 180/68 R
[58] Field of Search ................. 180/68 R, 68 P, 54 R, 180/54 A; 296/28 R; 248/300, 14, 232, 233; 123/41.51; 165/41, 67, 68, 77

[56] References Cited

U.S. PATENT DOCUMENTS

| 2,715,448 | 8/1955 | Zeeb | 180/68 R |
|---|---|---|---|
| 3,086,606 | 4/1963 | Schwiering et al. | 180/68 R |
| 3,121,467 | 2/1964 | Bryant | 180/68 R |

Primary Examiner—Joseph F. Peters, Jr.
Assistant Examiner—Gene A. Church
Attorney, Agent, or Firm—Koda and Androlia

[57] ABSTRACT

A support assembly for radiators and air conditioning condensors for motor vehicles which includes a support frame having a central opening and a center brace of roughly crank shaped cross section provided in the center of the frame and vertically cutting across the opening therein. The crank shaped cross section is formed by two parallel attachment faces which project laterally with respect to the opening in opposite directions and a member connecting the two faces. The two attachment faces are arranged and configured such that they respectively serve as a mount for an inboard side of the radiator and an inboard side of the condensor and such that the attachment face for the radiator overlaps the condensor and the attachment face for the condensor overlaps the radiator.

2 Claims, 3 Drawing Figures

SUPPORT ASSEMBLY FOR RADIATORS AND AIR CONDITIONING CONDENSORS

BACKGROUND OF THE INVENTION

1. Field of Invention

This invention relates to support assemblies utilized in motor vehicles and more particularly to support assemblies for radiators and air conditioning condensors utilized in motor vehicles.

2. Prior Art

Conventionally, many automobiles have mounted the radiator and the air conditioning condensor in a side-by-side arrangement at the forward end of the automobile body. In such automobiles, although the efficiency of heat radiation is better than in automobiles in which the radiator and air conditioning condensor are mounted behind one another, a large area is required for the passage of air through the system. Accordingly, these conventional side-by-side systems have suffered from a drawback that they cannot be used in automobiles in which the body has a small frontal area.

This invention has been designed to eliminate the aforementioned conventional drawbacks.

SUMMARY OF THE INVENTION

Accordingly, it is a general object of the present invention to provide a support for side-by-side mounting of a radiator and an air conditioning condensor for motor vehicles which reduces the required amount of frontal area.

It is another object of the present invention to provide a support for side-by-side mounting of a radiator and an air conditioning condensor in a motor vehicle which is low in cost and easy to manufacture.

In keeping with the principles of the present invention, the objects are accomplished by a unique support assembly for radiators and air conditioning condensors for motor vehicles which includes a support frame having a central opening therein and a center brace of roughly crank shaped cross section provided in the center of the frame and vertically cutting across the opening therein. The crank shaped cross section is formed by two parallel attachment faces which project laterally with respect to the opening in opposite directions and a member connecting the two faces. The two attachment faces are arranged and configured such that they respectively serve as a mount for an inboard side of the radiator and an inboard side of the condensor and such that the attachment face for the radiator overlaps the condensor and the attachment face for the condensor overlaps the radiator thereby reducing the area required to mount a radiator and condensor side by side in a motor vehicle.

BRIEF DESCRIPTION OF THE DRAWINGS

The above mentioned and other features and objects of the present invention will become more apparent by reference to the following description taken in conjunction with the accompanying drawings, wherein like reference numerals denote like elements, and in which.

DETAILED DESCRIPTION OF THE INVENTION

Figure 1:
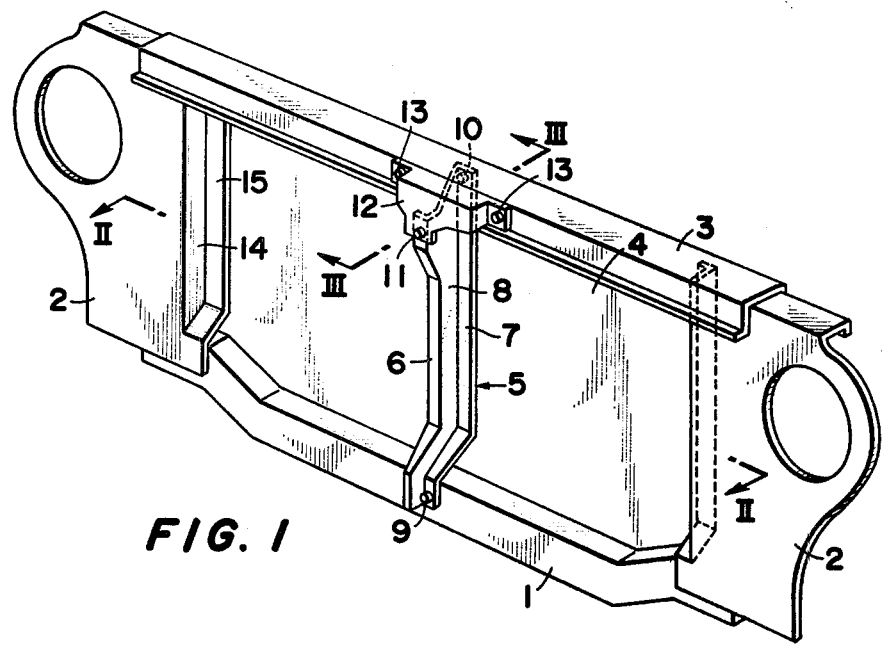
FIG. 1 is an oblique view of a support assembly for radiators and air conditioners in motor vehicles in accordance with the teachings of the present invention.

Referring to FIG. 1, shown therein is an oblique view of a support assembly for radiators and air conditioners of automobiles in accordance with the teachings of the present invention. As shown in FIG. 1, the support assembly includes two baffle plates 2 fastened along the bottom thereof to both ends of front cross member 1. Upper support 3 is also welded at both ends to the upper portion of baffle plate 2 thereby forming a structural unit. Accordingly, a roughly rectangular opening 4, with its greatest length in a horizontal direction, for mounting the radiator and air conditioning condensor is formed within the cross member 1, baffle plates 2 and upper support 3.

Figure 2:
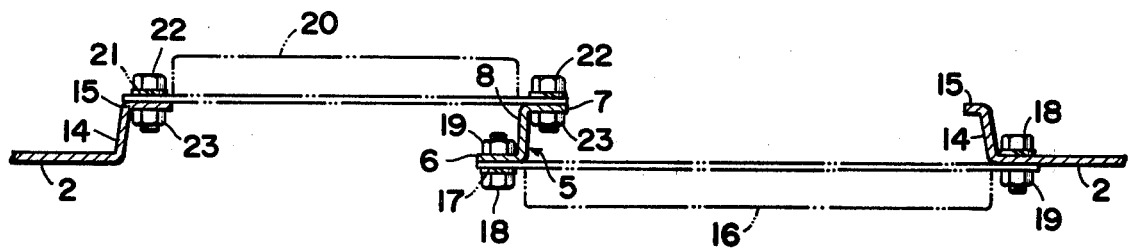
FIG. 2 is a cross section along the lines II—II in FIG. 1.
Figure 3:
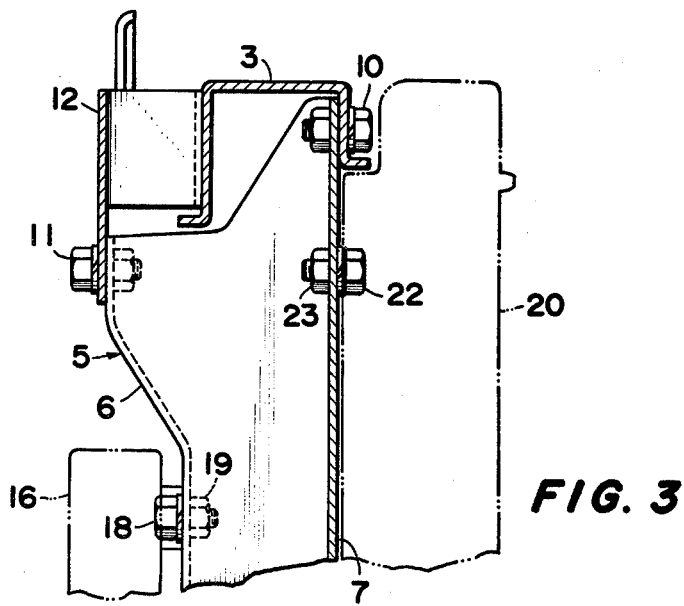
FIG. 3 is a magnified cross section along the line III—III in FIG. 1.

A center brace 5 is provided at the approximate center of the breadth of the motor vehicle and vertically cuts across the opening 4. As shown in FIG. 2, the center brace 5 is roughly crank shaped in horizontal cross section and consists of parallel attachment faces 6 and 7 which project laterally, with respect to the opening 4, in opposite directions from different points on a longitudinal line intersecting the opening 4 and a connecting part 8 which connects the faces 6 and 7.

The lower end of center brace 5 is fastened to the front surface of front cross member 1 by a bolt 9 and the upper end of center brace 5 is fastened to the inside surface of upper support 3 by a bolt 10. Furthermore, the upper end of forward attachment face 6 projects forward and this projecting portion is fastened to the hood lock 12 by a bolt 11. The hood lock 12 is fastened to the front surface of upper support 3 by a bolt 13. The edges of baffle plates 2 which face toward the center brace 5 are bent into steps 14 which recede to the rear from the front surface of the baffle plates 2. The steps 14 are then bent into attachment faces 15 which extend toward the center brace 5 and which are parallel with the front surface of the baffle plates 2.

The forward inboard attachment face 6 and the right hand baffle plate 2 (right hand with respect to the Figures), are located so that they are on the same plane with respect to the length of the vehicle body. Flanges 17 on the air conditioning condensor 16 are fastened to the attachment face 15 of the right hand baffle 2 and the attachment face 6 by bolts 18 and 19 so that the air conditioning condensor 16 is positioned between the center brace 5 and the right hand baffle plate 2.

Similarly, the rear attachment face 7 of center brace 5 is in the same plane as the attachment face 15 of the left hand baffle plate 2. Flanges 21 on both ends of radiator 20 are fastened to rear attachment face 7 of center brace 5 and attachment face 15 of left hand baffle plate 2 by bolts and nuts 22 and 23 so that the radiator 20 is positioned between center brace 5 and left hand baffle plate 2.

Therefore, the flange 17 of air conditioner condensor 16 together with attachment face 6 overlaps the radiator 20 and the flange 21 of radiator 20 together with attachment face 7 overlaps the air conditioner condensor 16.

From the above description, it should be apparent that by utilizing a support for a radiator and air conditioner condensor in accordance with the teachings of the present invention, the frontal area required for a side-by-side mounting of a radiator and air conditioning condensor is reduced without reducing the area of the air flow through the radiator and air conditioning condensor.

In all cases it is understood that the above described embodiment is merely illustrative of but one of the many possible specific embodiments which represent the application of the principles of the present invention. Numerous and various other arrangements can be readily devised in accordance with those principles by those skilled in the art without departing from the spirit and scope of the invention.

We claim:

1. A support assembly for side by side mounting of a radiator and an air conditioning condensor in a motor vehicle comprising:

a support frame having a central opening therein; and a center brace coupled to and vertically cutting across said support frame, said center brace having a crank shaped cross section formed by two parallel attachment faces projecting laterally to said opening in said support frame in opposite directions and a connecting member connecting said two attachment faces, said attachment faces being coupled to inboard sides of said radiator and said condensor such that one attachment face coupled to said radiator overlaps said condensor and the other attachment face coupled to said condensor overlaps said radiator whereby the area required to mount said radiator and condensor side by side in a motor vehicle is reduced.

2. A support assembly according to claim 1 wherein said support frame comprises two spaced apart baffle plates, an upper support coupled to and interconnecting the upper portions of said baffle plates and a front cross member coupled to and interconnecting the lower portions of said baffle plates whereby a structural unit of generally rectangular shape is formed.

* * * * *